(12) United States Patent
Noh et al.

(10) Patent No.: US 10,459,889 B2
(45) Date of Patent: Oct. 29, 2019

(54) MULTI-USER DATABASE EXECUTION PLAN CACHING

(71) Applicant: SAP SE, Walldorf (DE)

(72) Inventors: Jaeyun Noh, Seoul (KR); Taesik Yoon, Seoul (KR); Eun Kyung Chi, Seoul (KR)

(73) Assignee: SAP SE, Walldorf (DE)

( * ) Notice: Subject to any disclaimer, the term of this patent is extended or adjusted under 35 U.S.C. 154(b) by 319 days.

(21) Appl. No.: 15/615,504

(22) Filed: Jun. 6, 2017

(65) Prior Publication Data

US 2018/0349404 A1    Dec. 6, 2018

(51) Int. Cl.
| | |
|---|---|
| *G06F 16/00* | (2019.01) |
| *G06F 16/176* | (2019.01) |
| *G06F 16/242* | (2019.01) |
| *G06F 16/2453* | (2019.01) |
| *G06F 16/2455* | (2019.01) |
| *G06F 16/2452* | (2019.01) |

(52) U.S. Cl.
CPC ......... *G06F 16/176* (2019.01); *G06F 16/244* (2019.01); *G06F 16/24524* (2019.01); *G06F 16/24534* (2019.01); *G06F 16/24539* (2019.01); *G06F 16/24557* (2019.01)

(58) Field of Classification Search
CPC ......... G06F 16/24524; G06F 16/24534; G06F 16/24557; G06F 16/244; G06F 16/24539; G06F 16/176
See application file for complete search history.

(56) References Cited

U.S. PATENT DOCUMENTS

| | | | |
|---|---|---|---|
| 6,651,142 B1 * | 11/2003 | Gorelik | G06F 16/9574 711/119 |
| 6,985,904 B1 * | 1/2006 | Kaluskar | G06F 16/24539 |
| 8,224,806 B2 * | 7/2012 | Al-Omari | G06F 16/24524 707/713 |
| 2008/0065589 A1 | 3/2008 | Birka et al. | |

(Continued)

OTHER PUBLICATIONS

Qiong Luo, Sailesh Krishnamuthy, C. Mohan, Hamid Pirahesh, Honguk Woo, Bruce G. Lindsay, and Jeffery F. Naughton, " Middle-Tier Database Caching for e-Business", ACM SIGMOD 2002, Jun. 4-6, 2002, pp. 600-611. (Year: 2002).*

(Continued)

*Primary Examiner* — Cheryl Lewis
(74) *Attorney, Agent, or Firm* — Klarquist Sparkman, LLP

(57) ABSTRACT

Technologies are provided for using a multi-user execution plan cache to process database queries. A database query processor can be configured to store execution plans in a multi-user execution plan cache. The query processor can determine whether an execution plan is shareable by multiple database users. If the execution plan is shareable, it can be stored in the cache in association with a sharing user identifier. When a database query is received, the query processor can determine that the query can be performed using the cached execution plan. If the cached execution plan is shareable, the database query can determine whether the cached execution plan is valid for a database user associated with the received database query. If the cached execution plan is valid for the database user, the query processor uses the cached execution plan to perform the query for the associated database user.

20 Claims, 12 Drawing Sheets

(56) References Cited

U.S. PATENT DOCUMENTS

| | | |
|---|---|---|
| 2008/0114718 A1 | 5/2008 | Anderson et al. |
| 2008/0155574 A1 | 6/2008 | Gohel et al. |
| 2008/0222093 A1 | 9/2008 | Fan et al. |
| 2012/0084315 A1 | 4/2012 | Schneider et al. |
| 2013/0275468 A1 | 10/2013 | Lee et al. |
| 2014/0173720 A1 | 6/2014 | Jain et al. |
| 2016/0239542 A1 | 8/2016 | Yu et al. |
| 2019/0042621 A1* | 2/2019 | Qiu .................. G06F 16/24539 |

OTHER PUBLICATIONS

Shen-Tat Goh, Beng Chin Ooi, and Kian-Lee Tan, "Demand-Driven Caching in Multiuser Environment", IEEE Computer Society, pp. 112-114, IEEE Transactions on Knowledge and Data Engineering, vol. 16, No. 1, Jan. 2004. (Year: 2004).*

Shen-Tat Goh, Beng Chin Ooi, and Kian-Lee Tan, "An Efficient Method for Queries Execution in a Multi-User Environment", IEEE, 2001, pp. 312-319. (Year: 2001).*

Extended European Search Report, European Application No. 18175769.1, 9 pages, dated Jul. 30, 2018.

Sybase, "Adaptive Server Enterprise, New Features Guide," http://infocenter.sybase.com/help/topic/com.sybase.infocenter.dc00641.1572/pdf/new_features, 82 pages, Jun. 30, 2012 (accessed Jul. 20, 2018).

* cited by examiner

MULTI-USER DATABASE EXECUTION PLAN CACHING

BACKGROUND

Some database management systems generate compiled execution plans for use in executing database queries against databases. At least some such database management systems support execution plan caching, wherein an execution plan compiled for a given database query can be reused when the same database query is received as part of a subsequent request. However, such execution plan caching schemes often isolate cached execution plan access based on database user contexts. In such a caching scheme, a cached execution plan is associated with a database user context, and can only be used to process a subsequent database query that is associated with the same database user context.

Therefore, there is room for improvement in technologies related to execution plan caching schemes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, a computer-implemented method for processing a database query using a multi-user execution plan cache comprises receiving a query request comprising a database query and a database user identifier; identifying a compiled execution plan associated with the database query in the multi-user execution plan cache; determining that the compiled execution plan is associated with a sharing user identifier, which indicates that the compiled execution plan is shared by multiple database users; determining that the database user identifier is associated with one of the multiple database users sharing the compiled execution plan; and using the compiled execution plan to execute the database query against the database.

In another embodiment, a system for processing a database query using a shared execution plan cache comprises a database server that comprises a shared execution plan cache that comprises a pre-compiled execution plan associated with multiple database users. The database server further comprises a query processor configured to receive a query request comprising a database query and a database user identifier; use the database query to retrieve the pre-compiled execution plan from the shared execution plan cache; determine that the pre-compiled execution plan is associated with a sharing user identifier; determine whether the database user identifier is associated with the sharing user identifier for the pre-compiled execution plan; use the pre-compiled execution plan to execute the database query if the database user identifier is associated with the sharing user identifier; and otherwise compile an execution plan using the database query and use the compiled execution plan to execute the database query.

In another embodiment, one or more computer-readable media store instructions that, when executed by one or more processors, cause the one or more processors to perform operations, the operations comprising receiving a first request comprising a database query, wherein the first request is associated with a first database user; determining that a compiled execution plan for the database query does not exist in an execution plan cache in association with a sharing user identifier; determining that a compiled execution plan for the database query does not exist in the execution plan cache in association with the first database user; generating a compiled execution plan using the databases query; determining that the compiled execution plan is shareable; storing the compiled execution plan in the query plan cache in association with the sharing user identifier; using the compiled execution plan to execute the database query against a database; receiving a second request comprising the database query, wherein the second request is associated with a second database user; determining that the compiled execution plan for the database query exists in the query plan cache in association with the sharing user identifier; determining that the compiled execution plan is valid for the second database user; and using the compiled execution plan to execute the database query against the database.

As described herein, a variety of other features and advantages can be incorporated into the technologies as desired.

DETAILED DESCRIPTION

EXAMPLE 1

Overview

Figure 1:
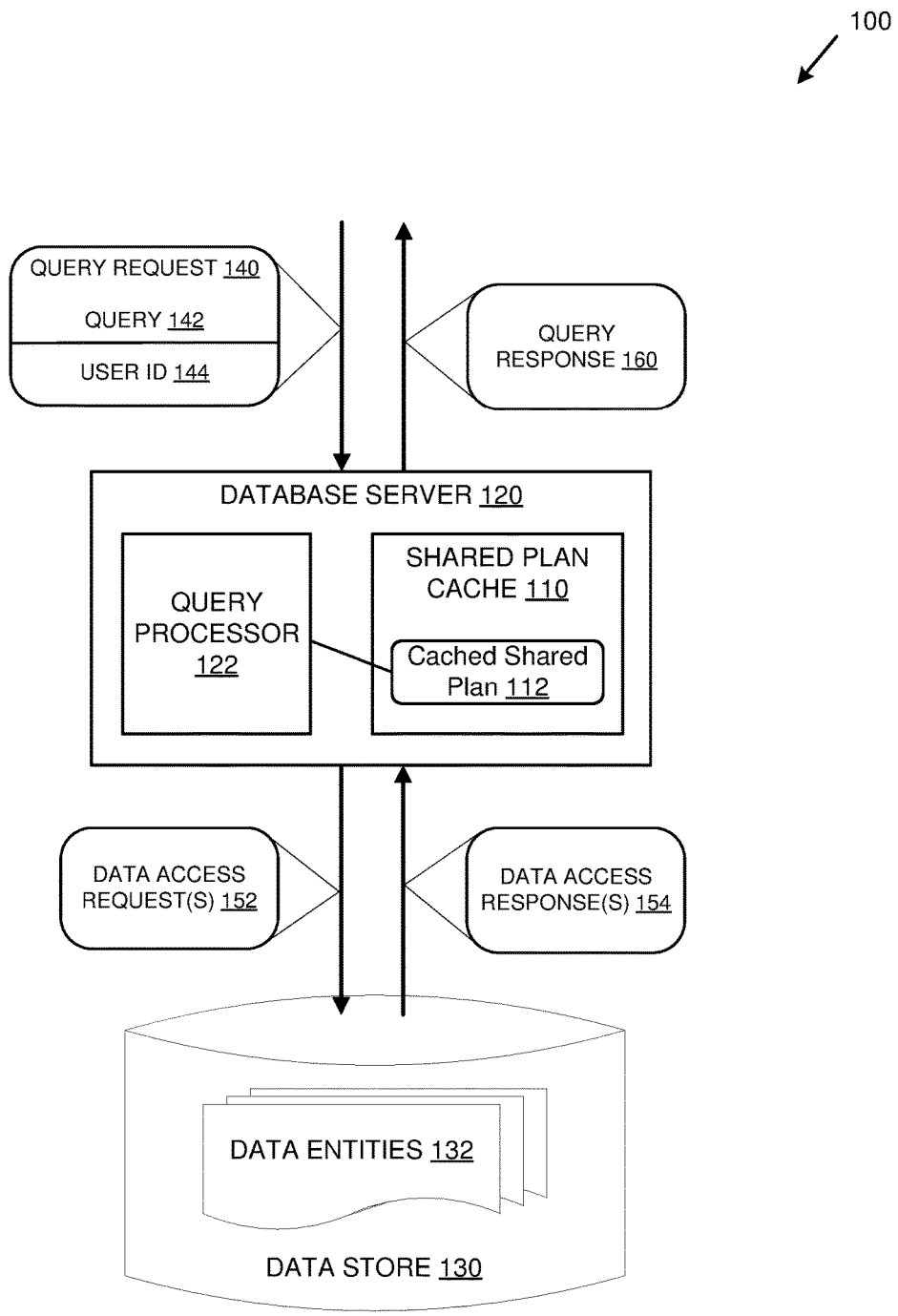
FIG. 1 is a system diagram depicting an example system for processing a database query request using a shared execution plan cache.

The description provided herein is directed to technologies for caching database execution plans for use in performing database queries for multiple database users.

A database management system can generate execution plans for executing queries against a database. However, in at least some cases, execution plans can be different for different database users, even when a same query is submitted by the different database users. For example, the queries provided by different users can include one or more same data entity identifiers, but the entity identifiers can resolve to different data entities that are associated with the different users. In some cases, the different database users may be associated with different numbers of data entity records for a data entity targeted by the query. Based on these differing record counts, different execution plans may be generated for executing the database query for the different users. For example, different join types (such as hash joins, for-loop joins, mixed joins, etc.) can be selected by a query processor when different numbers of records are being joined together. In such a scenario, different execution plans may be produced for the different users, even when a same query is provided by the different users.

At least some database systems that support execution plan caching have attempted to address this problem by maintaining separate execution plan caches for separate database users. However, in environments with several database users the benefits of execution plan caching can be diminished when separate execution plan cache records must be maintained for each database user. In such an environment, queries that are frequently executed by different users may be compiled multiple times, even when there is no difference in the execution plans that are generated for the different users. Additionally, the size of the execution plan cache in such an environment can be unnecessarily large, since the same execution plans may be cached multiple times for different users. In at least some environments where memory available for a plan cache is limited, such a caching scheme can make execution plan caching unfeasible.

Various technologies described herein can be used to create and maintain a shareable execution plan cache wherein cached execution plans can be shared by multiple users. As queries are compiled by a query processor, compiled execution plans can be identified that are shareable by multiple users. A shareable execution plan can be stored in an execution plan cache in association with a sharing user identifier. The execution plan can also be associated with a group of database users that can access the execution plan.

In one example, a request to perform a database query can be received by a query processor. The query processor can identify a database user associated with the request. The query processor can compile an execution plan using the database query, and use the compiled execution plan to execute the database query against a database. The query processor can determine that the database query can potentially be used by multiple database users to execute the database query. The query processor can store the execution plan in a multi-user execution plan cache in association with a sharing user identifier, which indicates that the execution plan is shareable among multiple database users. When a subsequent database request is received that contains the same database query, but is associated with a different database user, the query processor can determine whether the shareable execution plan in the multi-user execution plan cache is valid for the different database user. If the shareable execution plan is valid for the different database user, then it can be used to execute the database query for the different user. If the shareable execution plan is not valid for the different database user, then the query processor can compile a new execution plan for the different database user using the database query. In at least some embodiments, the new execution plan can be stored in the multi-user execution plan cache in association with the different database user.

EXAMPLE 2

Example Systems and Methods for Processing Database Queries Using Shared Execution Plan Caches In any of the examples described herein, a system can be provided for processing data base query requests using an execution plan cache that is accessible by multiple data base users.

FIG. 1 is a system diagram depicting an example system 100 for processing a database query request 140 using a shared execution plan cache 110.

The example system 100 comprises a database server 120 and a data store 130. The database server 120 comprises a query processor 122 and the shared execution plan cache 110. The data store 130 comprises multiple data entities 132. The query processor 122 is configured to receive the database query request 140. The database query request 140 comprises a database query 142 and a database user identifier 144.

The query processor 122 is configured to search the execution plan cache 110 for a cached execution plan (e.g. 112) corresponding to the query 142. The query processor 122 is configured to use an execution plan to process the database query 142. An execution plan can comprise one or more executable instructions that, when processed by the query processor 122) cause the query processor to transmit one or more data access requests 152 to the data store 130. The data access requests 152 can comprise one or more requests to add, edit, and/or delete data entities stored in the data store 130. The data store 130 can be configured to process the one or more data access requests 152 and to transmit one or more data access responses 154 to the database server 120. In at least some cases, one or more of the data access responses 154 can comprise all or part of one or more of the data entities 132. Alternatively or additionally, one or more of the data access responses 154 can comprise one or more messages indicating that one or more data entity edit and/or delete operations have been performed.

In at least some embodiments, the query processor 122 can be configured to use the database query 142 to retrieve the pre-compiled execution plan 112 from the shared execution plan cache 110. The shared execution plan cache 110 can comprise one or more pre-compiled execution plans. The one or more pre-compiled execution plans can be associated in the shared execution plan cache with one or more database queries that were previously used to generate the one or more pre-compiled execution plans. For example, the one or more database queries can be stored in the shared execution plan cache 110 as look-up keys that can be used to retrieve pre-compiled execution plans associated with the database queries. The query processor 122 can be configured to compare the database query 142 to the one or more database queries in the shared execution plan cache 110 and to retrieve one of the one or more pre-compiled execution plans associated with a query that matches the database query 142. In the example scenario depicted in FIG. 1, the query processor 122 matches the database query 142 with a database query (not shown) associated with the pre-compiled execution plan 112. In a particular embodiment, the one or more pre-compiled execution plans are associated with hashes of the one or more database queries. In such an embodiment, the query processor 122 can be configured to generate a hash of the database query 142 and to search the shared execution plan cache 110 for a hashed database query that matches the generated hash of the database query 142.

The shared execution plan cache 110 can be configured to associate the one or more pre-compiled execution plans with database users. An association between a pre-compiled execution plan and a database user can indicate that, when a query is received by the query processor 122 that is associated with the database user, if the query matches the query stored in association with the pre-compiled execution plan in the shared execution plan cache 110, then the pre-compiled execution plan can be used to process the received query. In at least some embodiments, pre-compiled execution plans can be associated with database users by storing the pre-compiled execution plans in association with identifiers that uniquely identify various database users defined in the database.

The shared execution plan cache 110 can be configured to associate a pre-compiled execution plan with a sharing user identifier. Associating the pre-compiled execution plan with the sharing user identifier can indicate that the query processor 122 can use the pre-compiled execution plan to process queries for more than one database user. In at least some embodiments, access to the pre-compiled execution plan associated with the sharing user identifier can be restricted to one or more identified database users. For example, a record in the shared execution plan cache 110 (not shown) can associate a pre-compiled execution plan with the sharing user identifier and a list of one or more database user identifiers associated with the sharing user identifier for the pre-compiled execution plan.

After retrieving the pre-compiled execution plan 112 from the shared execution plan cache 110, the query processor 122 can be configured to determine whether the pre-compiled execution plan 112 is associated with the sharing user identifier. For example, the query processor 122 can inspect a record stored in the shared execution plan cache 110 associated with the pre-compiled execution plan 112 that indicates whether or not the pre-compiled execution plan 112 is associated with the sharing user identifier. If the pre-compiled execution plan 112 is associated with the sharing user identifier, the query processor 122 can determine whether the database user identifier 144 is associated with the sharing user identifier for the pre-compiled execution plan 112. If the database user identifier 144 is associated with the sharing user identifier for the pre-compiled execution plan 112, then the query processor 122 can use the pre-compiled execution plan 112 to execute the database query 142. However, if the database user identifier 144 is not associated with the sharing user identifier for the pre-compiled execution plan 112, the query processor 122 can compile a new execution plan using the database query 142 and use the newly compiled execution plan to execute the database query 142.

In at least one embodiment, if the query processor 122 compiles a new execution plan using the database query 142, the query processor 122 can compare the compiled execution plan to the pre-compiled execution plan 112 to determine whether the compiled execution plan and the pre-compiled execution plan 112 are equivalent. In at least some embodiments, the query processor can determine whether or not the execution plans are equivalent by comparing metadata data files associated with the execution plans that describe data entities accessed by the respective execution plans and operations performed by the respective execution plans. In at least some such embodiments, the metadata files can be generated when the respective execution plans are compiled.

Determining that the execution plans are equivalent can comprise analyzing the execution plans (and/or the metadata files associated with the execution plans) to determine whether they perform the same operations, refer to the same data entities, and/or do not involve access to restricted data entities. If the execution plans are equivalent, the query processor 122 can update the shared execution plan cache 110 to associate the database user identifier 144 with the sharing user identifier for the pre-compiled execution plan 112. In such an embodiment, subsequent query requests comprising the query 142 and the user identifier 144 can be processed by the query processor 122 using the pre-compiled execution plan 112.

In a different or further embodiment, if the query processor 122 determines that the newly compiled execution plan and the pre-compiled execution plan 112 are not equivalent, the query processor 122 can store the newly compiled execution plan in the shared execution plan cache 110 in association with the database query 142 and the database user identifier 144. In such an embodiment, subsequent query requests comprising the query 142 and the user identifier 144 can be processed by the query processor 122, at least in part, by retrieving the newly compiled execution plan from the shared execution plan cache 110.

In at least some embodiments, if the pre-compiled execution plan 112 is not associated with the sharing user identifier, the query processor 122 can determine whether the pre-compiled execution plan 112 is associated with the database user identifier 144. If the pre-compiled execution plan 112 is associated with the database user identifier 144, then the query processor 122 can execute the database query 142 using the pre-compiled execution plan 112. However, if the pre-compiled execution plan is not associated with the database user identifier 144, the query processor 122 can compile a new execution plan using the database query 142, and use the newly compiled execution plan to execute the database query 142.

Figure 2:
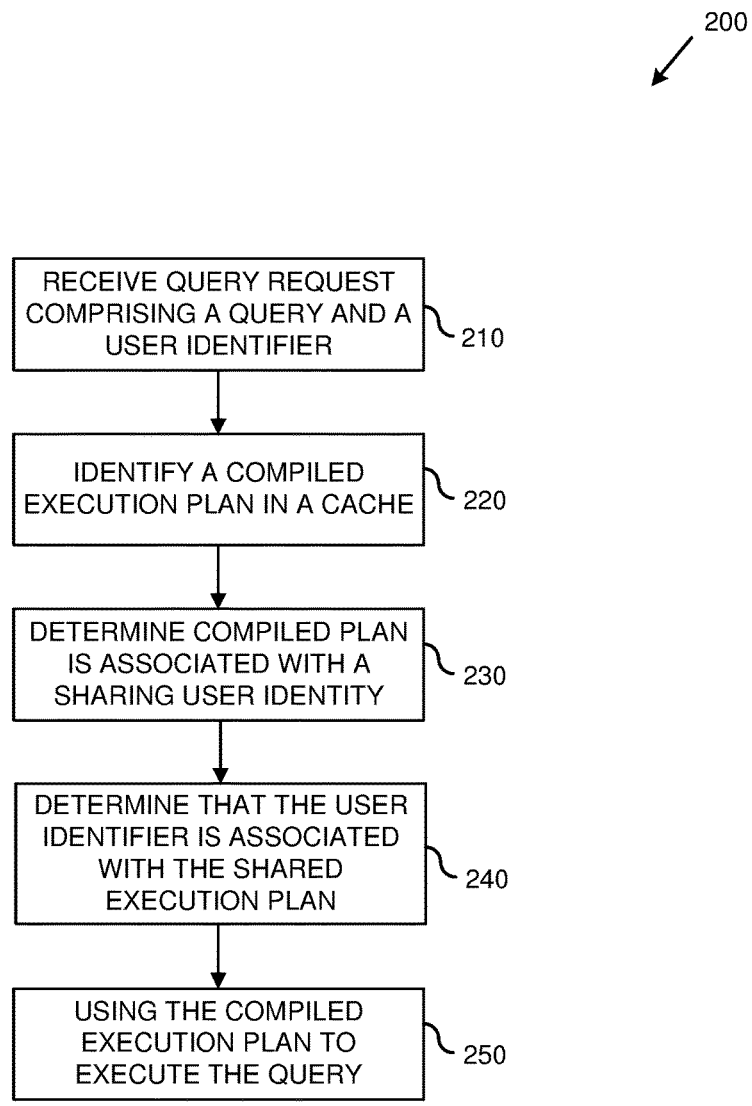
FIG. 2 is a flowchart of an example method for processing a database query using a shared execution plan cache.

FIG. 2 is a flowchart depicting an example method 200 for processing a database query using a multi-user shared execution plan cache. Any of the example systems described herein can be used to perform the example method 200.

At 210, a query request is received that comprises a database query a database user identifier. In at least some embodiments, the query request can be received over a computer network via one or more wired and/or wireless computer network connections. In a different or further embodiment, the query request can be received from an application running on a same computing device as a database management server that receives and processes the request.

The database query can comprise one or more database commands written in a query syntax (such as a structured query language (SQL), etc.). Example database commands include commands to retrieve data from a database, edit data stored in the database, delete data stored in the database, execute a procedure or function defined in the database, etc. The database user identifier can comprise a value (such as a numerical value, an alpha-numerical value, etc.) that uniquely identifies a database user defined in the database.

In at least some embodiments, the database user identifier can comprise an identifier for a database session or database connection with which the database user is associated. For example, the query request can comprise an identifier for an active database session (or database connection) associated with the database user. Such a session (or connection) can be established by transmitting a request to the database to establish a new session (or connection). The request to establish the new session (or connection) can comprise authentication credentials associated with the database user in the database. The authentication credentials can be verified and the new session (or connection) can be established with the requester. The database can transmit a unique session (or connection) identifier to the requester that can be provided by the requester as part of the query request.

At 220, a compiled execution plan associated with the database query is identified in an execution plan cache. The database query can be used to search the execution plan cache for a compiled execution plan that is associated with the database query. For example, the execution plan cache can comprise previously compiled execution plans for various database queries. The previously compiled execution plans can be associated with the various database queries that were used to generate the execution plans. The execution plan cache can be stored in memory and/or storage of one or more computing devices, such as one or more database servers, that make up the database.

The database can comprise a query processor that can parse received database queries and compile execution plans based on the parsed queries that can be used to execute the queries using data stored in the database. For example, a database query can be received that comprises one or more commands written in a declarative query language (such as SQL, etc.). The query processor can parse the one or more declarative commands and generate executable instructions that can be used to perform the one or more declarative commands The executable instructions can be compiled into an execution plan that, when executed, performs the database query.

Once an execution plan has been compiled, it can be stored in the execution plan cache in association with the database query used to generate the execution plan. A determination can be made as to whether the compiled execution plan is shareable. A shareable execution plan can be an execution plan that can be used to execute the associated database query for more than one database user.

Determining whether the compiled execution plan is shareable can comprise determining that execution of the compiled execution plan for the given database user requires access to one or more data entities (such as data records, data roads, data fields, documents, objects, etc.) to which access is restricted. Data entities can be associated with various access permissions the control which operations can be performed using the data entities. For example, a compiled execution plan for a given database user may access a data entity to which the database user has exclusive access. In a particular example, the compiled execution plan requires access to a custom data entity (such as a user-defined view, etc.) that was defined by the database user. In such a scenario, the execution plan cannot be used in an execution context that is not associated with the given database user, and thus is not shareable.

In at least some embodiments, determining whether the compiled execution plan is shareable comprises determining whether execution of the compiled execution plan for a given database user requires a compile-time determination of a user-specific operation. A compile-time determination of a user-specific operation can comprise a compile-time evaluation of an expression in the database query. This can be done, for example, as a compile-time optimization of the database query. In at least some cases, the value of the expression may vary for different database users. For example, the database query may include an invocation of a function that, when evaluated, returns a name of a current database user or other database user-specific information. If such a function invocation is replaced by the returned value of the function at compile time, then different execution plans may be generated for the same database query for different users. If a compile-time determination of a user-specific operation is detected as part of the compiled execution plan, then the given compiled execution plan may not be shareable among the multiple database users.

In at least some embodiments, determining whether the compiled execution plan is shareable comprises determining whether the compiled execution plan comprises a custom implementation of a database operation. For example, a particular value and/or operation that is determined and/or executed during the compilation of the execution plan may vary based on which database user is associated with an execution plan compilation context. In a particular example, a default implementation is given for a particular database operation (such as a database function, etc.). The default implementation can be overridden by database users, who can provide separate, custom implementations for the database operation. Such a database operation can be detected using the compiled execution plan and/or the database query. If such an operation is detected as part of the compiled execution plan, then execution plans compiled for the database query for various database users may differ, and thus the given compiled execution plan may not be shareable among the multiple database users.

If the compiled execution plan is determined to be shareable, then the compiled execution plan can be stored in the execution plan cache in association with a sharing user identifier. The sharing user identifier can comprise a value that indicates that the associated compiled execution plan is shareable. In at least some embodiments, the sharing user identifier is a same format as database user identifiers associated with database users. In at least some embodiments, the sharing user identifier can be a database user identifier associated with a special database user used for sharing execution plans.

Alternatively, the sharing user identifier can have a different format than the format that is used by database user identifiers. For example, the sharing user identifier can comprise one or more characters that are not used in database user identifiers, and thus can be used to differentiate the sharing user identifier from one or more database user identifiers.

At 230, it is determined that the compiled execution plan identified at 220 is associated with the sharing user identifier. The execution plan cache can comprise a record associating the compiled execution plan with the sharing user identifier. The sharing user identifier can indicate that the compiled execution plan is shareable. In at least some embodiments, the compiled execution plan is identified by matching a database query associated with the compiled execution plan with the database query received as part of the query request at 210. The execution plan cache can then be searched for the record that associates the compiled execution plan with the sharing user identifier. Alternatively, the execution plan cache can be searched for a record that contains a database query matching the database query received as part of the query requested 210, and that is associated with the sharing user identifier. In such an embodiment, the compiled execution plan can be associated with the identified record.

At 240, it is determined that the database user identifier received as part of the query requested 210 is associated with one of the multiple database users sharing the compiled execution plan. Compiled execution plans that are associated with the sharing user identifier can be associated with multiple database users that are authorized to access the compiled execution plan. In at least some embodiments, a list of database user identifiers associated with database users authorized to access the compiled execution plan can be stored in the execution plan cache in association with the compiled execution plan. The list of database user identifiers can be searched to determine whether or not the list contains the database user identifier received as part of the query request at 210. If the list contains the user identifier, it can be determined that the database user identifiers associated with the one of the multiple database users sharing the compiled execution plan.

Additionally or alternatively, the compiled execution plan can be analyzed to determine whether or not it is valid for the database user associated with the received database user identifier. For example, one or more instructions in the compiled execution plan can be analyzed to identify data entities that will be accessed when the one or more instructions are executed. Permissions associated with the one or more identified data entities in the database can be analyzed to determine whether the database user associated with the received database user identifier has permission to perform the operations on the one or more data entities. If the compiled execution plan is valid for the database user associated with the received database user identifier, then it can be determined that the database user identifier is associated with one of the multiple users sharing the compiled execution plan.

In at least some embodiments, the list of user identifiers associated with the compiled execution plan is searched and, if the received database user identifier is not found in the list, then the execution plan is analyzed to determine whether the execution plan is valid for the database user associated with the received database user identifier. In at least one such embodiment, if the received database user identifier is not found in the list then a new execution plan is compiled using the received database query for the database user associated with the received database user identifier. The new execution plan is then compared with the compiled execution plan in the execution plan cache to determine whether the execution plans are equivalent. If the execution plans are equivalent, then the received database user identifier is added to the list of database user identifiers associated with the compiled execution plan. Additionally or alternatively, determining that the execution plans are equivalent can comprise comparing metadata for the new execution plan with metadata for the compiled execution plan. Such metadata can describe data entities targeted by an associated execution plan and/or database operations that will be performed when the associated execution plan is executed. Such metadata can be generated for an execution plan when the execution plan is compiled. Subsequent database requests comprising the database query and the user identifier can be processed using the cached compiled execution plan instead of generating a new compiled execution plan.

At 250, the compiled execution plan is used to execute the database query against the database. For example, the database query can be executed against the database, and such execution can comprise executing the compiled execution plan. Executing the compiled execution plan can comprise executing one or more machine-readable instructions identified in the compiled execution plan using one or more processors to perform one or more database operations on one or more data entities stored in the database. Executing the compiled execution plan can comprise creating one or more query results using all or part of one or more data entities in the database, and transmitting the query results to the requester from which the query request was received.

EXAMPLE 3

Example Execution Plans

In any of the examples described herein, an execution plan can comprise an ordered set of executable instructions that can be used to perform one or more data access operations in a database. In at least some cases, execution plans can be referred to as query execution plans and/or query plans. In at least some embodiments, a received database query can comprise one or more statements in a declarative syntax (such as a structured query language (SQL), etc.). A query processor can be configured to generate an execution plan by translating the one or more declarative statements into an ordered set of executable instructions that, when executed by one or more processors, perform data access operations to fulfill the requested query. Example data access operations include data read operations, data write operations, etc. In at least some embodiments, generating an execution plan can comprise identifying data structures in the database to be accessed to perform the query (such as tables, views, indexes, functions, procedures, etc.). In different or further embodiments, generating an execution plan can comprise determining data access and manipulation strategies (such as joining strategies, filtering strategies, projection strategies, lookup strategies, etc.) to be used when performing the query.

EXAMPLE 4

Example Entities

In any of the examples described herein, an entity can be a construct defined in a database or data store. In at least some embodiments, an entity can be a construct defined for storing data in the database or data store. Such entities can be referred to as "data entities." Example data entities include database tables, database table columns, data fields, etc. In an embodiment comprising an object-oriented data store, example data entities can include object definitions. In an embodiment comprising a document store, example data entities can include document schemas and/or templates. In at least some embodiments, instances of a data entity can be stored in a database or data store where the data entity is defined. Example data entity instances include database table rows, database table row field values, objects, documents, etc. In at least some cases, data entity instances can be retrieved from the database or data store where one or more data entities are defined by providing a query to the database or data store, wherein the query comprises one or more data entity identifiers.

In at least some embodiments, an entity can be a functional construct stored in a database or data store. Such entities can be referred to as "functional entities." Example functional entities include user-defined functions, stored procedures, views, triggers, indexes, etc. In at least some embodiments, a functional entity can be accessed and/or invoked by providing a query to the database or data store where the functional entity is defined, wherein the query comprises an entity identifier associated with the functional entity.

In at least some embodiments, entities can be associated with access permissions. An entity access permission can identify one or more entities to which the access permission pertains, one or more operations that can be performed using the one or more entities (such as read operations, rate operations, delete operations, execute operations, etc.), and one or more database user identifiers (and/or database user group identifiers). Entity access permissions can be positive and/or negative. For example, a positive entity access permission can indicate that an identified database user (and/or identified database user group) is authorized to perform an identified operation using an identified entity. In another example, a negative entity access permission can indicate that an identified database user (and/or identified database user group) is not authorized to perform an identified operation using an identified entity.

EXAMPLE 5

Example Shared Execution Plan Cache Searching

In any of the examples described herein, a system can be provided for processing database query requests using multiple plan cache searches.

Figure 3:
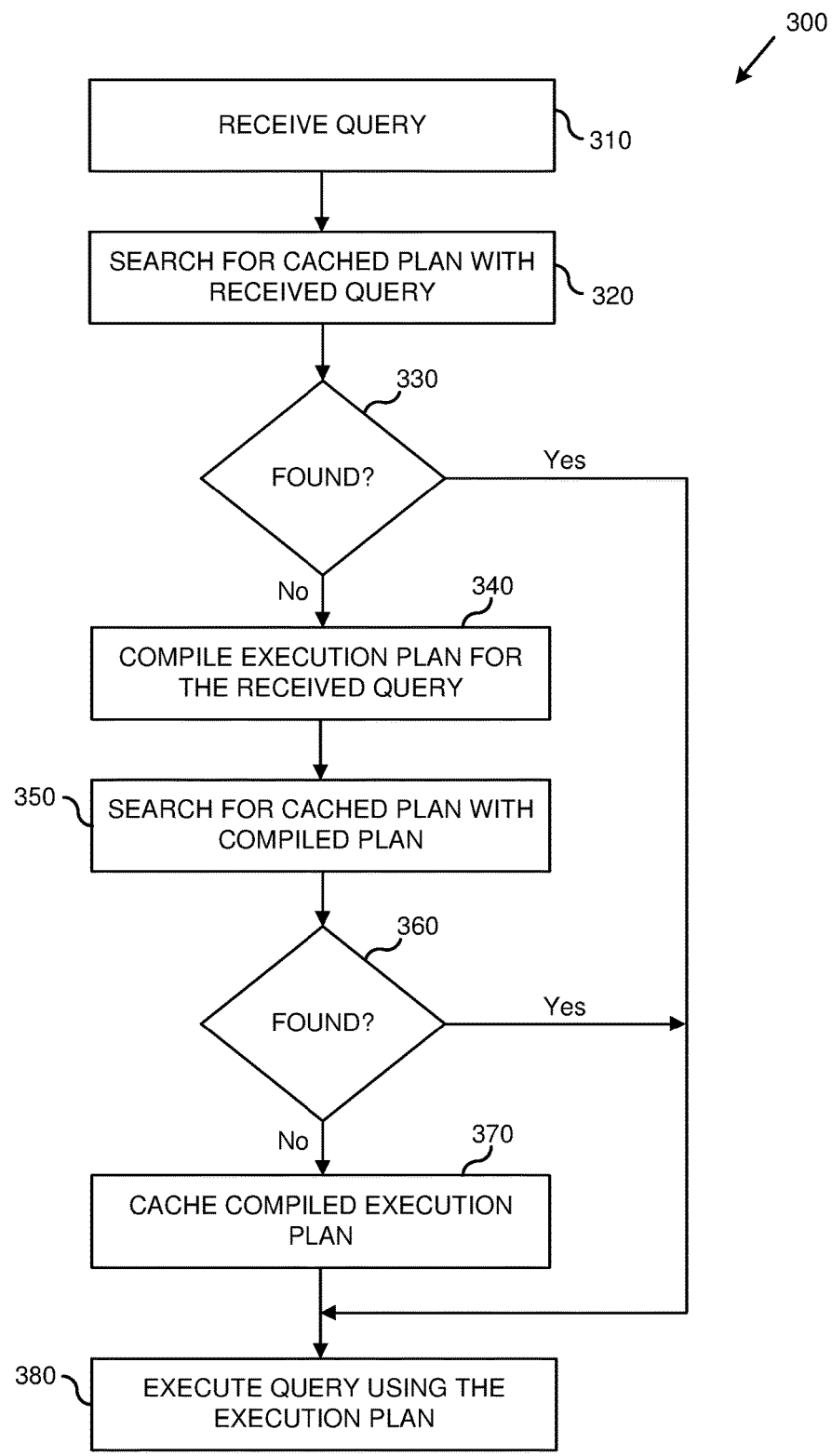
FIG. 3 is a flowchart of another example method for processing a database query using a multi-user shared execution plan cache.

FIG. 3 is a flowchart of an example method 300 for processing a database query using a multi-user execution plan cache. Any of the example systems described herein can be used to perform the example method 300.

At 310, a database query is received, along with a database user identifier. The database user identifier can be a value that uniquely identifies the database user in a database. Additionally or alternatively, the database user identifier can identify a database session or database connection with which a given database user is identified. In at least some embodiments, a given database session identifier or database connection identifier can be used to look up an identifier for a database user associated with the database session and/or database connection.

At 320, a multi-user execution plan cache is searched with the received database query and database user identifier. The multi-user execution plan cache can comprise one or more pre-compiled execution plans stored in a memory and/or storage of the database server in association with database queries for which the execution plans were compiled. The multi-user execution plan cache can be used to store execution plans the can be shared among the multiple database users and/or to store execution plans the can only be used by a single database user. A cached execution plan that can be shared among the multiple database users can be stored in the multi-user execution plan cache in association with a sharing user identifier. In at least some embodiments, the shareable cached execution plan can be associated with a list of database user identifiers for database users that can access the shared cached execution plan. A cached execution plan that can only be accessed by a single database user can be associated with the database user identifier for that database user, instead of the sharing user identifier.

In at least some embodiments, the multi-user execution plan cache comprises multiple separate caches associated with different database user identifiers. For example, the multi-user execution plan cache can comprise an execution plan cache associated with the sharing user identifier, which can be used to store shareable execution plans; and one or more other execution plan caches associated with different database user identifiers for different database users. Alternatively, the multi-user execution plan cache can store shareable and unshareable execution plans in a same cache. For example, a user identifier (such as the sharing user identifier or a database user identifier) can be linked to a cached execution plan in addition to a database query. In a particular embodiment, the combination of the database query and a user identifier can be used as a key to search for an execution plan in the multi-user execution plan cache.

Figure 4:
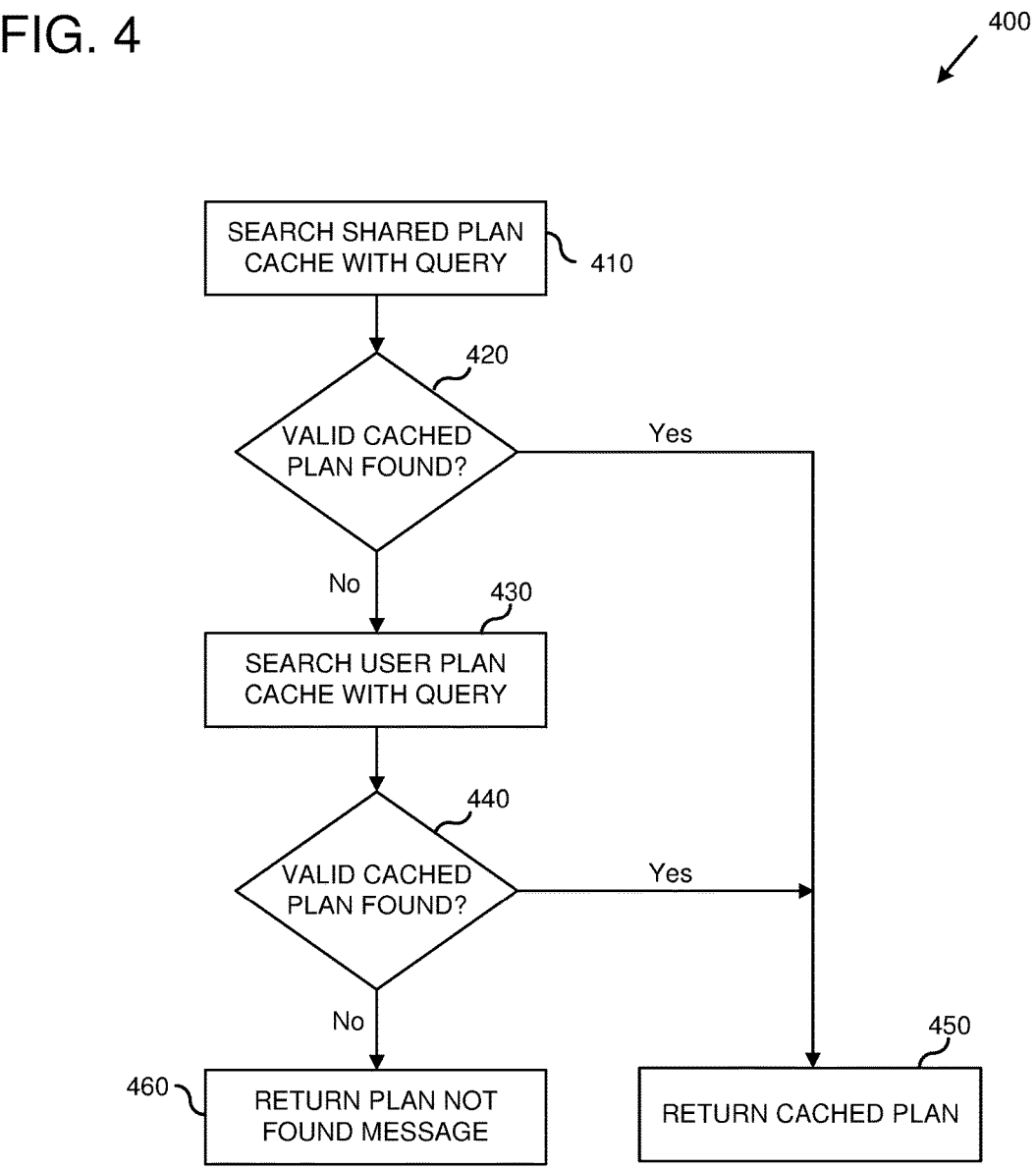
FIG. 4 is a flowchart of an example method for searching a multi-user execution plan cache using a database query and a database user identifier.

FIG. 4 is a flowchart of an example method 400 for searching a multi-user execution plan cache using a database query and a database user identifier. Any of the example systems described herein can be used to perform the example method 400.

At 410, a shared execution plan cache is searched using a database query. The shared execution plan cache can comprise a separate cache and/or multiple cache records in the multi-user execution plan cache that is/are associated with the sharing user identifier. Cache records in the shared execution plan cache can be searched using all or part of the database query. For example, the database query can comprise database query text that can be compared with database query text stored in association with the execution plans in the shared execution plan cache. An execution plan in the shared execution plan cache can be determined to be a match if the database query text stored in association with the execution plan is equal to the database query text of the provided database query. In at least some embodiments, determining that an execution plan is a match comprises determining that a hash of the database query text of the provided database query matches a hash of database query text stored in association with the execution plan.

In a different or further embodiment, determining that an execution plan is a match comprises determining that a hash of a combination of the query text and the sharing user identifier matches a hash stored in association with the execution plan. For example, hash of a combination of the sharing user identifier and database query text that was used to generate the execution plan can be stored in the shared execution plan cache in association with the execution plan. If a hash of a combination of the sharing user identifier and the database query text of the provided database query matches the hash stored in association with the execution plan, then it can be determined that the execution plan matches the provided database query.

At 420, it is determined whether a valid execution plan was found in the shared execution plan cache. If a matching execution plan was found in the shared execution plan cache, then the matching execution plan is analyzed to determine whether or not it is valid.

Determining whether the matching execution plan is valid can comprise determining whether a version of a data entity that is referenced by the database query is equal to a version of the data entity that is referenced by the matching execution plan. For example, when an execution plan is generated, data entities that are referenced by a database query used to generate execution plan can be identified. When a change is made to a data entity in the database, a version number of the data entity can be changed to a new version number. Version numbers for the one or more data entities referenced by the database query can be identified and stored as part of the execution plan to indicate the versions of the identified data entities that are targeted by the execution plan. In different or further embodiments, the version numbers of the one or more data entities can be stored as part of a metadata file that is stored in association with the compiled execution plan. In at least one embodiment, the version numbers for the one or more data entities can be timestamps that represent dates and/or times when the last updates to the one or more data entities were performed.

One or more data entities targeted by the received database query can be identified, and current version numbers for the one or more data entities can be retrieved from the database. The retrieved version numbers can be compared to the version numbers for the one or more data entities stored with the matching execution plan. If one or more of the corresponding version numbers do not match, it can be determined that the cached execution plan is invalid. For example, a data entity in the database can be identified that is targeted by the received database query. A version number of the data entity in the database can be compared to a version number of the data entity associated with the compiled execution plan. Determining that the compiled execution plan is valid can comprise determining that the version numbers match.

In at least some embodiments, a list of data entities referenced by the compiled execution plan, and their associated version numbers, can be stored in a metadata file associated with the compiled execution plan. Such a metadata file can be generated, for example, when the execution plan is compiled. The metadata file can be analyzed to determine whether the received database query targets the same versions of the same data entities as the compiled execution plan. If the received database query does not target the same versions of the same data entities as the compiled execution plan, then it can be determined that the compiled execution plan is invalid for the database user associated with the received database user identifier.

In at least some embodiments, determining whether the compiled execution plan is valid comprises determining whether a database location associated with the compiled execution plan is a same database location targeted by the database query. A database location can be a particular database node, database instance, database shard, etc. For example, a first database location may be targeted by a database query used to generate the compiled execution plan and a second, different database location may be targeted by the received database query. This may occur, for example, when a database node (or database instance, database mirror, database shard, etc.) that is associated with a given data entity referenced by a database query is changed. Additionally or alternatively, a targeted database location can change when a restore operation or fail-over operation is performed on the given database. When the compiled execution plan is generated, a database location identifier can be stored in association with the compiled execution plan in the shared execution plan cache. The stored database location identifier can be compared to a database location identifier for the database location currently targeted by the received database query. The compiled execution plan can be determined to be invalid if the database location identifiers do not match.

Determining whether a matching execution plan in the shared execution plan cache is valid can comprise determining whether the provided database user identifier is included in a list of database user identifiers for database users that are authorized to share the matching execution plan. If the provided database user identifier is not included in the list of authorized database user identifiers, then it can be determined that the matching execution plan is not valid for the database user associated with the provided database user identifier.

If a valid execution plan was found, then at 450 the valid cached execution plan is returned. If a valid execution plan cache was not found, then at 430 a user-specific execution plan cache is searched using the database query. In at least some embodiments, the user-specific execution plan cache and the shared plan cache can be separate caches, wherein the shared execution plan cache is associated with a sharing user identifier and the user-specific execution plan cache is associated with a database user identifier provided with the database query. In at least some other embodiments, the shared execution plan cache and the user-specific execution plan cache can comprise separate records in a multi-user execution plan cache. For example, the multi-user execution plan cache may contain one or more records that associate cached execution plans with the sharing user identifier, and the multi-user execution plan cache may contain one or more other records that associate cached execution plans with the database user identifier provided with the database query. In such an embodiment, records associated with the sharing user identifier can be searched at 410 and records associated with the provided database user identifier can be searched at 430.

In at least some embodiments, the user-specific execution plan cache can be searched in a similar manner as the shared execution plan cache. All or part of the provided database query can be used to identify a matching execution plan that is associated with the provided database user identifier.

In at least one embodiment, determining that an execution plan is a match comprises determining that a hash of a combination of the query text and the database user identifier provided with the database query matches a hash stored in association with the execution plan. For example, a hash of a combination of a database user identifier for a database user associated with the execution plan and database query text that was used to generate the execution plan can be stored in the multi-user execution plan cache in association with the execution plan. If a hash of a combination of the database user identifier provided with the database query and the database query text of the provided database query matches the hash stored in association with the execution plan, then it can be determined that the execution plan matches the provided database query for the database user associated with the database user identifier provided with the database query.

At 440, it is determined whether a valid execution plan was found in the user-specific execution plan cache. If a matching execution plan was found, a determination is made as to whether the matching execution plan is valid. Determining whether the matching execution plan is valid can comprise a same or similar analysis as that described above with respect to the determination made at 420.

If a valid execution plan was found, then the valid cached execution plan is returned at 450. If a valid execution plan was not found, then a message is returned at 460 that indicates that an execution plan matching the database query was not found in the multi-user execution plan cache.

Returning to FIG. 3, at 330 it is determined whether a cached execution plan was found for the received database query in the multi-user execution plan cache. If a cached execution plan was not found, then at 340 an execution plan is compiled for the received database query. Compiling the execution plan for the received database query can comprise parsing one or more statements (such as one or more SQL statements, etc.) in the received query, and generating one or more executable commands that, when executed, perform database operations described in the one or more statements. The one or more executable commands can be compiled into a single compiled execution plan that is associated with the database query.

At 350, the multi-user execution plan cache is searched with the compiled execution plan. In at least some embodiments, a database server can comprise multiple query processors capable of processing separate database queries in parallel. For example, the multiple query processors can comprise one or more different processes and/or one or more different threads in a multithreaded execution environment. In such an embodiment, it is possible for one query processor to search the multi-user execution plan cache, not find an execution plan associated with a received query, and proceed to compile an execution plan for the received query. Meanwhile, a separate query processor may complete compilation of an execution plan for the same query (received as part of a separate database query request), and add the compiled execution plan to the multi-user execution plan cache. In such a scenario, performing the subsequent search at 350 can identify the cache entry added by the other query processor and thus avoid a race condition, wherein two separate query processors attempt to add entries to the multi-user execution plan cache for a same database query. In such an embodiment, a synchronization mechanism (such as a mutex, critical section, etc.) can be used to coordinate access to the multi-user execution plan cache among the multiple query processors.

Additionally or alternatively, searching the multi-user execution plan cache with the database query and the compiled execution plan can, in at least some cases, identify execution plan distinctions for a given database query that would not be apparent from the query text alone. For example, different database users may have access to different data entities in the database, which can result in different execution plans being generated for different database users for the same database query. The compiled execution plan can be compared with a cached execution plan for the same database query to determine whether the cached execution plan can be used to execute the database query for the database user associated with the database user identifier received with the database query at 310.

Figure 5:
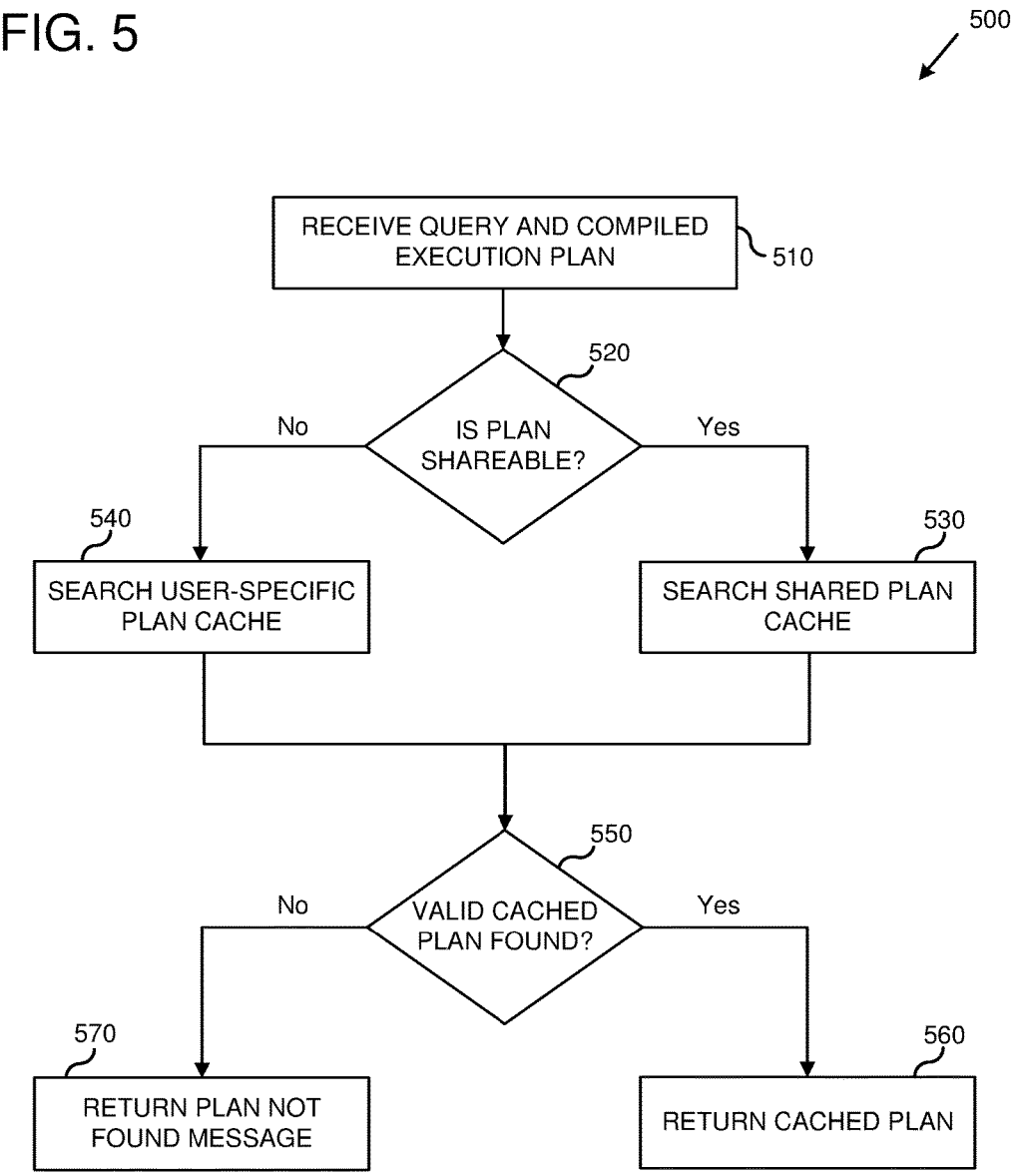
FIG. 5 is a flowchart of an example method for searching a multi-user execution plan cache using a compiled execution plan.

FIG. 5 is a flowchart of an example method 500 for searching a multi-user execution plan cache using a compiled execution plan. Any of the example systems described herein can be used to perform the example method 500.

At 510, a database query and compiled execution plan are received. A database user identifier can also be received along with the database query and the compiled execution plan.

At 520, it is determined whether the compiled execution plan is shareable. A shareable execution plan can be an execution plan that can be used to execute an associated database query for multiple, different database users. Determining whether the compiled execution plan is shareable can comprise determining whether execution of the compiled execution plan requires access to one or more data entities (such as data records, data rows, data fields, documents, objects, etc.) to which access is restricted. Data entities can be associated with various access permissions that control which operations can be performed using the data entities. For example, a compiled execution plan for a given database user may access a data entity to which the database user has exclusive access, or to which access is limited to less than all database users. In a particular example, the compiled execution plan requires access to a custom data entity (such as a user-defined view, etc.) that was defined by a database user associated with the received database user identifier. In such a scenario, it can be determined that the compiled execution plan is not shareable.

In at least some embodiments, the compiled execution plan can be determined to be sharable even when access to one or more data entities targeted by the compiled execution plan is limited, so long as access is not restricted to a single database user. For example, in at least some cases, multiple database users that each have access to the one or more data entities targeted by the compiled execution plan can share access to the compiled execution plan.

In some scenarios, shareability of a cached execution plan may need to be reevaluated if access permissions for one or more data entities targeted by the cached execution plan change. In at least some embodiments, such a reevaluation can be performed as part of an execution plan validity analysis (such as the validity analysis performed at 550 in the example method 500 or 420 in the example method 400). For example, a version number of a data entity can be changed when access permissions associated with the data entity change. In such a scenario, a validity analysis that performs a version number comparison as described herein can detect the change to the access permissions and invalidate the cached execution plan.

In at least some embodiments, determining whether the compiled execution plan is shareable comprises determining whether execution of the compiled execution plan for a given database user requires a compile-time determination of a user-specific operation. A compile-time determination of a user-specific operation can comprise a compile-time evaluation of an expression in a database query. This can be done, for example, as a compile-time optimization of the database query. In at least some cases, the value of the expression may differ for different database users. For example, the database query may include an invocation of a function that, when evaluated, returns a name of a current database user or other database user-specific information. If such a function invocation is replaced by the returned value of the function at compile time, then different execution plans may be generated for the same database query for different users. If a compile-time determination of a user-specific operation is detected as part of the compiled execution plan and/or using metadata associated with the compiled execution plan, then it can be determined that the compiled execution plan is not shareable.

In at least some embodiments, determining whether the compiled execution plan is shareable comprises determining whether the compiled execution plan comprises a custom implementation of a database operation. For example, a particular value and/or operation that is determined and/or executed during the compilation of the execution plan may vary based on which database user is associated with an execution plan compilation context. In a particular example, a default implementation is given for a particular database operation (such as a database function, etc.), which can be overridden by various database users. A database user can provide a custom implementation for the database operation that can be used, instead of the default implementation, as part of an execution plan that involves the particular database operation. Such a custom database operation implementation can be detected using the compiled execution plan, metadata associated with the compiled execution plan, and/or the database query. If such an operation is detected as part of the compiled execution plan, then it can be determined that the compiled execution plan is not shareable.

In at least some embodiments, determining whether the compiled execution plan is shareable comprises determining whether the compiled execution plan uses one or more user-defined data entity synonyms. A data entity synonym can comprise a mapping between an identifier of a data entity in the database and a custom name defined by a database user. The database user can provide database queries using the custom name and, when the execution plan is generated for the database query, the data entity synonym can be resolved and the custom name can be replaced with the data entity identifier. In some cases, multiple database users can map a same custom name to different data entities using different synonym definitions. In such cases, different database users may provide a same database query, but different data entities will be targeted by the execution plans generated for the database query for the different users. Thus, in such embodiments, the compiled execution plan can be determined to not be shareable if the compiled execution plan was generated using a database query that uses one or more data entity synonyms.

If it is determined that the compiled execution plan is shareable, then at 530 a shared execution plan cache is searched for a cached execution plan corresponding to the compiled execution plan. If it is determined that the compiled execution plan is not shareable, then at 540, a user-specific execution plan cache is searched for a cached execution plan corresponding to the compiled execution plan.

In at least some embodiments, the user-specific execution plan cache and the shared execution plan cache can be separate caches, wherein the shared execution plan cache is associated with a sharing user identifier and the user-specific execution plan cache is associated with a database user identifier provided with the database query. In at least some other embodiments, the shared execution plan cache and the user-specific execution plan cache can comprise separate records in a same multi-user execution plan cache. For example, the multi-user execution plan cache may contain one or more records that associate cached execution plans with the sharing user identifier, and the multi-user execution plan cache may contain one or more other records that associate cached execution plans with the database user identifier provided with the database query and the compiled execution plan. In such an embodiment, records associated with the sharing user identifier can be searched at 530, and records associated with the provided database user identifier can be searched at 540.

Searching an execution plan cache can comprise searching for an entry in the execution plan cache that is associated with the received database query. In at least some embodiments, an execution plan cache (such as the shared plan cache and/or the user-specific plan cache) can comprise a data structure that allows all or part of a database query to be used as a key to look up an execution plan in the cache that corresponds to the database query. Example data structures that can be used for this purpose include key-value stores, hash tables, indexes, etc.

At 550, it is determined whether a valid execution plan was found in the execution plan cache that was searched. If a matching plan is found in the searched execution plan cache, the matching execution plan is compared with the compiled execution plan to determine whether the cached plan is valid for the database user associated with the received database user identifier.

Determining whether the matching execution plan is valid can comprise determining whether a version of a data entity that is referenced by the compiled execution plan is equal to a version of the data entity that is referenced by the matching cached execution plan. For example, when an execution plan is generated, data entities that are referenced by a database query used to generate execution plan can be identified. When a change is made to a data entity in the database, a version number of the data entity can be changed to a new version number. Version numbers for the one or more data entities referenced by the database query can be identified and stored as part of the execution plan to indicate the versions of the identified data entities that are targeted by the execution plan. In different or further embodiments, the version numbers of the one or more data entities can be stored as part of a metadata file that is stored in association with the execution plan. In at least one embodiment, the version numbers for the one or more data entities can be timestamps that represent dates and/or times when the last updates to the one or more data entities were performed.

Version numbers for one or more data entities targeted by the compiled execution plan can be identified and compared to version numbers for the one or more data entities targeted by the matching cached execution plan. If one or more of the corresponding version numbers do not match, it can be determined that the cached execution plan is invalid.

In at least some embodiments, a list of data entities referenced by the cached execution plan, and their associated version numbers, can be stored in a metadata file associated with the cached execution plan. Such a metadata file can be generated, for example, when an execution plan is compiled. The metadata file for the cached execution plan can be compared to a metadata file generated for the compiled execution plan to determine whether the compiled execution plan targets that same versions of the same data entities as the cached execution plan. If the compiled execution plan does not target the same versions of the same data entities as the cached execution plan, then it can be determined that the cached execution plan is invalid for the database user associated with the received database user identifier.

In at least some embodiments, determining whether the matching cached execution plan is valid comprises determining whether a database location targeted by the compiled execution plan is a same database location targeted by the cached execution plan. A database location can be a particular database node, database instance, database shard, etc. For example, a first database location can be targeted by a database query used to generate the cached execution plan and a second, different database location can be targeted by the compiled execution plan. This may occur, for example, when a database node (or database instance, database mirror, database shard, etc.) that is associated with a given data entity referenced by the compiled execution plan is changed. Additionally or alternatively, a targeted database location can change when a restore operation or fail-over operation is performed on the given database. When an execution plan is generated, a database location identifier can be stored in association with the execution plan (for example, as part of a metadata file associated with the execution plan). The database location identifier for the cached execution plan can be can be compared to a database location identifier for the compiled execution plan. The cached execution plan can be determined to be invalid if the database location identifiers do no match.

In at least some embodiments, multiple database location identifiers can be associated with multiple data entities targeted by an execution plan. For example, in a database environment comprising multiple database nodes, a data entity (such as a data table, etc.) may be moved from one database node to another database node. In such an embodiment, database node locations of each data entity targeted by an execution plan can be stored in association with the execution plan (e.g., as part of a metadata file associated with the execution plan). Database node identifiers for data entities targeted by the cached execution plan can be compared to database node identifiers for data entities targeted by the compiled execution plan and the cached execution plan can be determined to be invalid if the database node identifiers for the compared data entities do not match.

Determining whether a matching execution plan in the shared execution plan cache is valid can comprise comparing the compiled execution plan and the cached execution plan to determine whether the execution plans are equivalent. The execution plans can be determined to be equivalent, for example, if the execution plans perform the same operations in the same order, using the same data entities. Determining that the execution plans are equivalent can comprise comparing metadata associated with the respective execution plans that describes operations performed by the execution plans and/or entities targeted by the execution plans. In at least some embodiments, such metadata can be generated for an execution plan when the execution plan is compiled. In such an embodiment, the metadata files for the cached execution plan and the compiled execution plan can be compared to determine whether the execution plans are equivalent.

If the compiled execution plan is not equivalent to the cached execution plan, then the cached execution plan can be determined to be invalid for the database user associated with the received database user identifier. If the execution plans are equivalent then, in at least some embodiments, the received database user identifier can be added to a list of database user identifiers associated with the cached execution plan in the shared execution plan cache. Adding the received database user identifier to the list of database user identifiers can indicate that the cached execution plan can be used to perform the received database query for the database user associated with the received database user identifier.

If a valid cached execution plan was found, then at 560 the valid cached execution plan is returned. If a valid execution plan was not found, then at 570 a message is returned that indicates that an execution plan was not found in the multi-user execution plan cache that corresponds to the database query and that is equivalent to the compiled execution plan.

Returning to FIG. 3, at 360 it is determined whether a cached execution plan was found in the multi-user execution plan cache that matches the compiled execution plan. If a matching cached execution plan was not found, then at 370 the compiled execution plan is stored in the multi-user execution plan cache. Storing the compiled execution plan in the multi-user execution plan cache can comprise storing the compiled execution plan in a memory and/or storage of a computing device (such as a database server, etc.). The compiled execution plan can be stored in association with the received database query. For example, a record can be added to the cache that associates the received database query with the compiled execution plan. In at least some embodiments, the record can comprise an entry in a data structure (such as a key-value store, etc.) that stores the received database query as a key that can be used to lookup the record associated with the compiled execution plan. In a different or further embodiment, the data structure can comprise a hash table that stores a hash of the database query in association with the compiled execution plan.

If it is determined that the compiled execution plan is shareable, then the compiled execution plan can be stored in the multi-user execution plan cache in association with the sharing user identifier. In at least some embodiments, the compiled execution plan can be associated with a list of database user identifiers for database users that are allowed to access the shareable compiled execution plan. In such an embodiment, the database user identifier received with the database query can be added to the list of user identifiers.

If it is determined that the compiled execution plan is not shareable, the compiled execution plan can be stored in the multi-user execution plan cache in association with the database user identifier received with the database query. In embodiments where the multi-user execution plan cache comprises multiple caches associated with separate database user identifiers, if the compiled execution plan is shareable, the compiled execution plan can be added to a shared cache associated with the sharing user identifier. In such an embodiment, if the compiled execution plan is not shareable, the compiled execution plan can be added to a user-specific cache associated with the database user identifier received with the database query.

In at least some embodiments, a check is made to determine whether an invalid execution plan is already stored in the multi-user execution plan cache that is associated with the received database query. If an invalid execution plan is already stored in the multi-user execution plan cache in association with the received database query, the invalid execution plan can be replaced in the multiuser execution plan cache with the compiled execution plan. For example, an existing record in the multi-user plan cache that lengths the received database query with the invalid execution plan can be updated to link the database query with the compiled execution plan instead. Alternatively, a record linking the database query with the invalid execution plan can be deleted and a new record linking the database query with the compiled execution plan can be added to the cache.

At 380, the database query is executed using an execution plan. If a matching execution plan was found in in the multi-user execution plan cache as a result of the search at 320 or the search at 350, then the execution plan that is used is the cached execution plan. If a matching execution plan was not found in the multi-user execution plan cache, then the execution plan that is used is the execution plan compiled at 340.

Optionally, if it is determined at 360 that a matching cached execution plan was found in the multi-user execution plan cache, then the database user identifier can be associated with the cached execution plan in the multi-user execution plan cache. When a subsequent request is received comprising the same database query and the same user identifier, then the search at 320 will locate the cached execution plan and the cached execution plan can be used to execute the database query for the database user at 380 without performing the compilation at 340 and the search at 350.

EXAMPLE 6

Example Multi-User Execution Plan Caching

In any of the examples described herein, a system can be provided for processing multiple database query requests from multiple database users using a shared execution plan cache.

Figure 6:
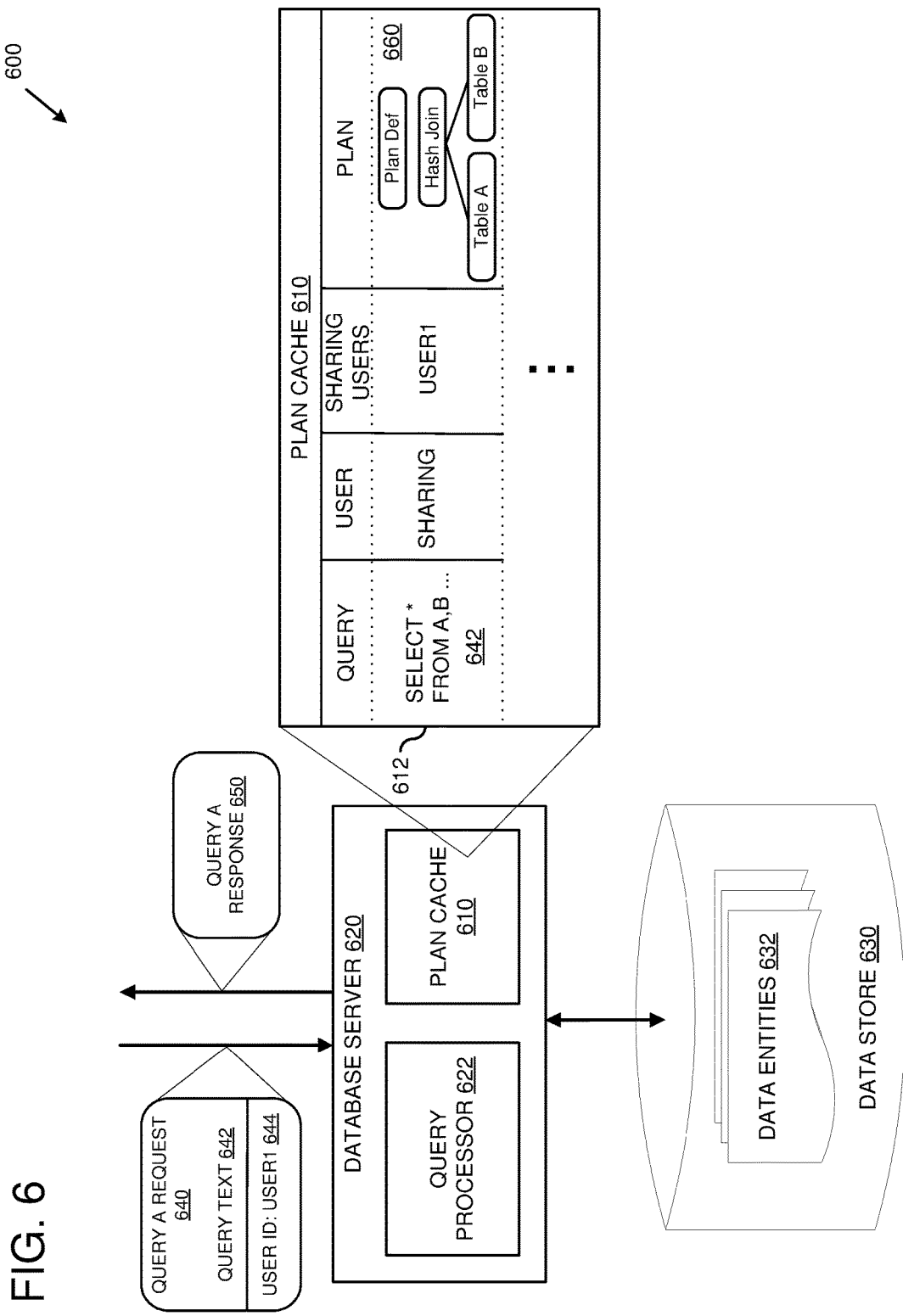
FIGS. 6-10 are system diagrams depicting an example system configured to process multiple database query requests associated with multiple database users using a shared execution plan cache.

FIG. 6 is a system diagram depicting an example system 600 configured to use a shared execution plan cache 610 to process multiple database query requests (e.g., 640) associated with different database user identifiers (e.g., 644).

The example system 600 comprises a database server 620 and a data store 630. The database server 620 comprises a query processor 622 and the shared execution plan cache 610. The database server 620 is connected to the data store 630 via one or more wired and/or wireless communication channels. The query processor 622 is configured to process database query requests (e.g., 640) using the shared execution plan cache 610 and the data store 630. The data stored 630 comprises one or more data entities 632. The query processor 622 is configured to process a query request by executing an execution plan, wherein executing the execution plan can cause the query processor 622 to add, edit, and/or delete one or more of the data entities 632 in the data store 630. Using techniques described herein, the query processor 622 can compile an execution plan using query text (e.g. 642) in the query request (e.g. 640) and/or retrieve a pre-compiled execution plan corresponding to the query text from the shared execution plan cache 610.

In the example scenario depicted in the FIG. 6, the query processor 622 is configured to receive the query request 640, comprising the query text 642 and a database user identifier 644. The query processor 622 is configured to use the query text 642 to search the shared execution plan cache 610 for a pre-compiled execution plan corresponding to the query text 642. In this example scenario, the query processor 622 does not find a pre-compiled execution plan for the query text 642 in the plan cache 610. The query processor 622 is configured to compile an execution plan 660 based on the query text 642 and to use the compiled execution plan 660 to execute the requested query using one or more data entities 632 in the data stored 630. (The depiction of the execution plan 660 in FIG. 6 is provided for illustration purposes and is not intended to be limiting.) The query processor 622 generates the query response 650 and transmits the query response 650 to the requester that transmitted the query request 640.

The query processor 622 is configured to determine whether the compiled execution plan 660 a shareable using techniques described herein. In the example scenario depicted in FIG. 6, the query processor 622 determines that the compiled execution plan 660 is shareable and stores the compiled execution plan 660 in the shared execution plan cache 610. The query processor 622 creates a new record 612 in the shared execution plan cache 610 comprising the compiled execution plan 660 and the query text 642. The cache record 612 associates the compiled execution plan 660 with a sharing user identifier that indicates that the compiled execution plan 660 is shareable. The query processor 622 associates the cache record 612 with a sharing users list, and adds the database user identifier 644 to the sharing users list for the cache record 612.

Figure 7:
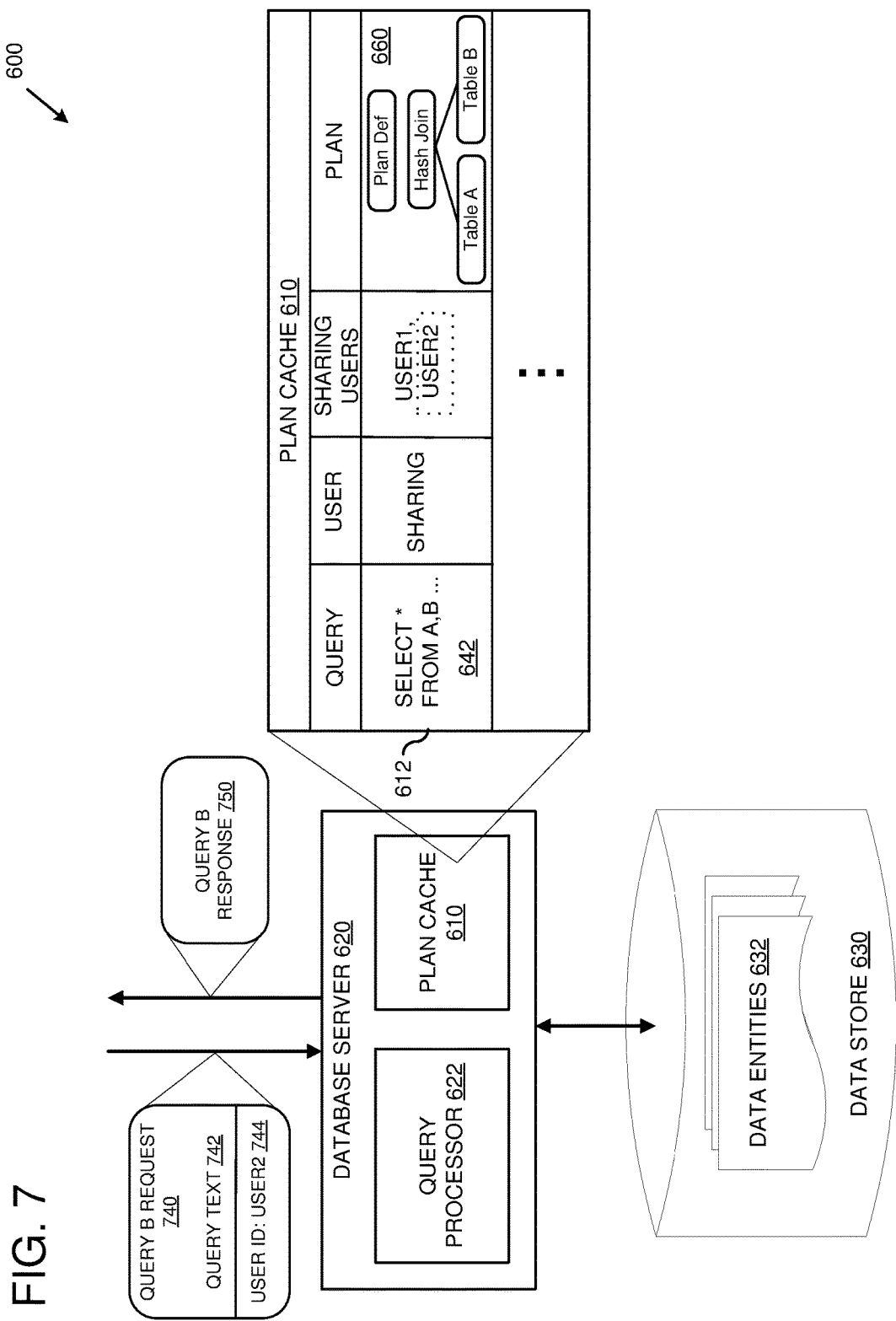

FIG. 7 is a system diagram depicting the example system 600 in another scenario wherein the database server 620 receives a second database query request 740. The database request 740 comprises query text 742 and an identifier 744 for a second database user. The query processor 622 is configured to receive the database query requests 740 and a search the shared execution plan cache 610 for a compiled execution plan that is associated with the query text 742 and that it is associated with the sharing user identifier. In the example scenario depicted in FIG. 7, the query processor 622 matches the query text 742 with the query text 642 stored in the cache record 612. The query processor 622 inspects the sharing users list associated with the cache record 612 and determines that the sharing users list does not include the database user identifier 744.

The query processor 622 then searches the shared execution plan cache 610 for compiled execution plan that is associated with the query text 742 and the database user identifier 744. In the example scenario depicted in FIG. 7, the query processor 622 does not find a cache record in the shared plan cache 610 for the query text 742 that is associated with the database user identifier 744. The query processor 622 compiles a new execution plan using the query text 742 and uses the newly compiled execution plan to perform the requested database query using one or more of the data entities 632 in the data store 630. The query processor 622 then generates a query response 750 and transmits the query response 750 to the requester that transmitted the query request 740.

Using techniques described herein, the query processor 622 determines whether the newly compiled execution plan is shareable. If the newly compiled execution plan is shareable, the query processor 622 compares the newly compiled execution plan with the compiled execution plan 660 (which corresponded to the query text 742 in the initial search performed by the query processor 622) and, using techniques described herein, determines whether the newly compiled execution plan is equivalent to the compiled execution plan 660. Additionally or alternatively, using techniques described herein, determining whether the execution plans are equivalent can comprise determining whether metadata associated with the newly compiled execution plan matches metadata associated with the compiled execution plan 660 (not shown). In the example scenario depicted in FIG. 7, the query processor 622 determines that the newly compiled execution plan is shareable and equivalent to the compiled execution plan 660. The query processor 622 adds the identifier 744 for the second database user to the list of sharing users associated with the cache record 612.

Figure 8:
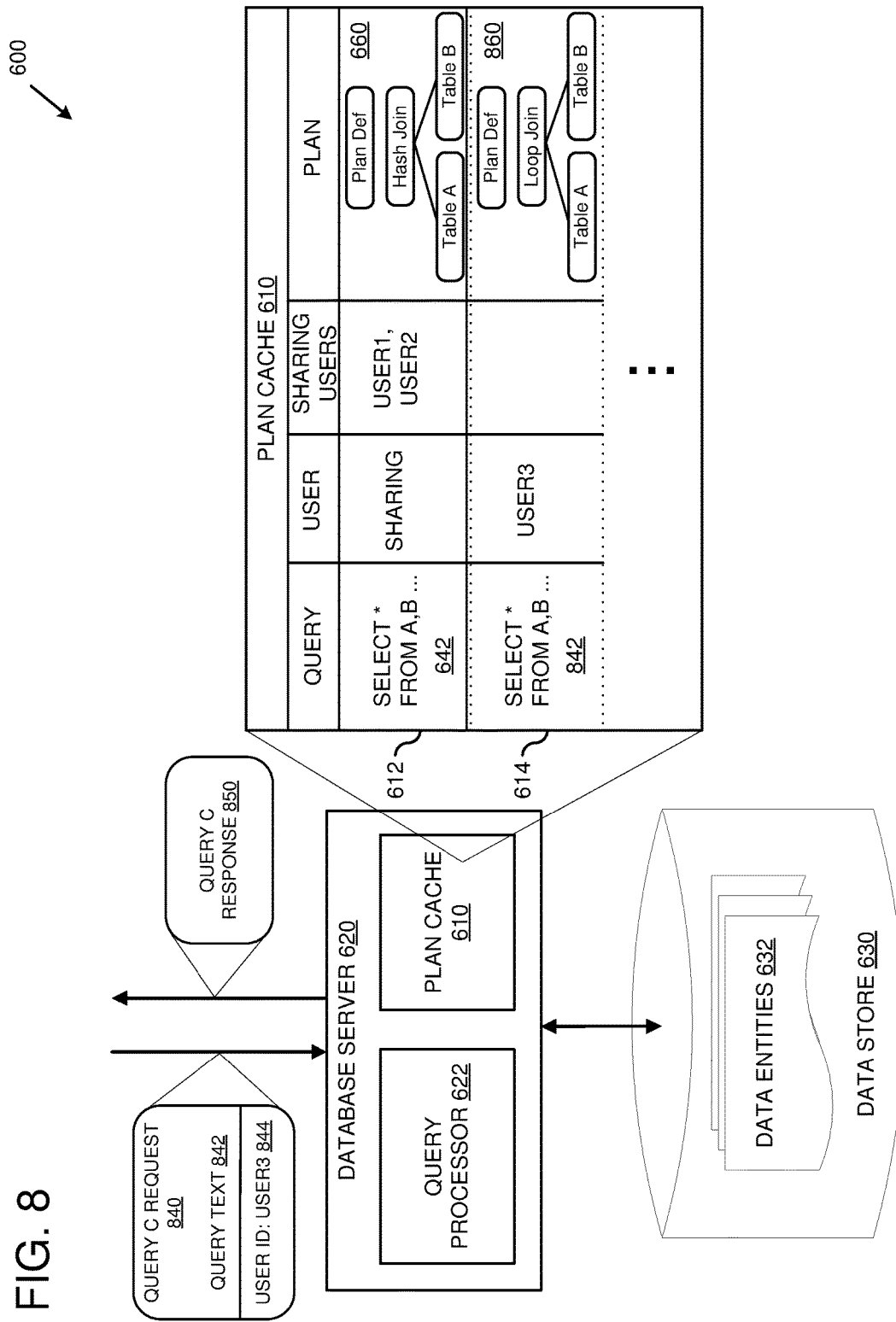

FIG. 8 is a system diagram depicting the example system 600 in another example scenario wherein the database server 620 receives a third database query request 840. The database query request 840 comprises query text 842 and an identifier 844 for a third database user. The query processor 622 searches the shared execution plan cache 610 for a compiled execution plan that is associated with the query text 842 and that is associated with the sharing user identifier. In the example scenario depicted in FIG. 8, the query processor 622 determines that the query text 842 matches the query text 642 associated with the compiled execution plan 660 in the cache record 612. The query processor 622 searches the sharing user list associated with the cache record 612, but does not find the database user identifier 844 in the list of database user identifiers.

The query processor 622 then searches the shared execution plan cache 610 for a compiled execution plan that is associated with the query text 842 and the database user identifier 844. In the example scenario depicted in FIG. 8, the query processor 622 does not find a cache record in the shared plan cache 610 for the query text 842 that is associated with the database user identifier 844. The query processor 622 compiles a new execution plan 860 using the query text 842, and uses the newly compiled execution plan 860 to perform the requested database query using one or more of the data entities 632 in the data store 630. (The depiction of the execution plan 860 in FIG. 8 is provided for illustration purposes and is not intended to be limiting.) The query processor 622 then generates a query response 850 and transmits the query response 850 to the requester that transmitted the query request 840.

Using techniques described herein, the query processor 622 determines whether the newly compiled execution plan 860 is shareable. In the example scenario depicted in FIG. 8, the query processor 622 determines that the compiled execution plan 860 is not shareable. For example, due to one or more data entity access restrictions for the third database user, the compiled execution plan 860 may be different than an execution plan that would be compiled for the same query text 842 for a different database user.

The query processor 622 adds the compiled execution plan 860 to the shared execution plan cache 610. The query processor 622 creates a cache record 614 comprising the compiled execution plan 860 and the query text 842. The query processor 622 associates the cache record 614 with the identifier 844 for the third database user.

Figure 9:
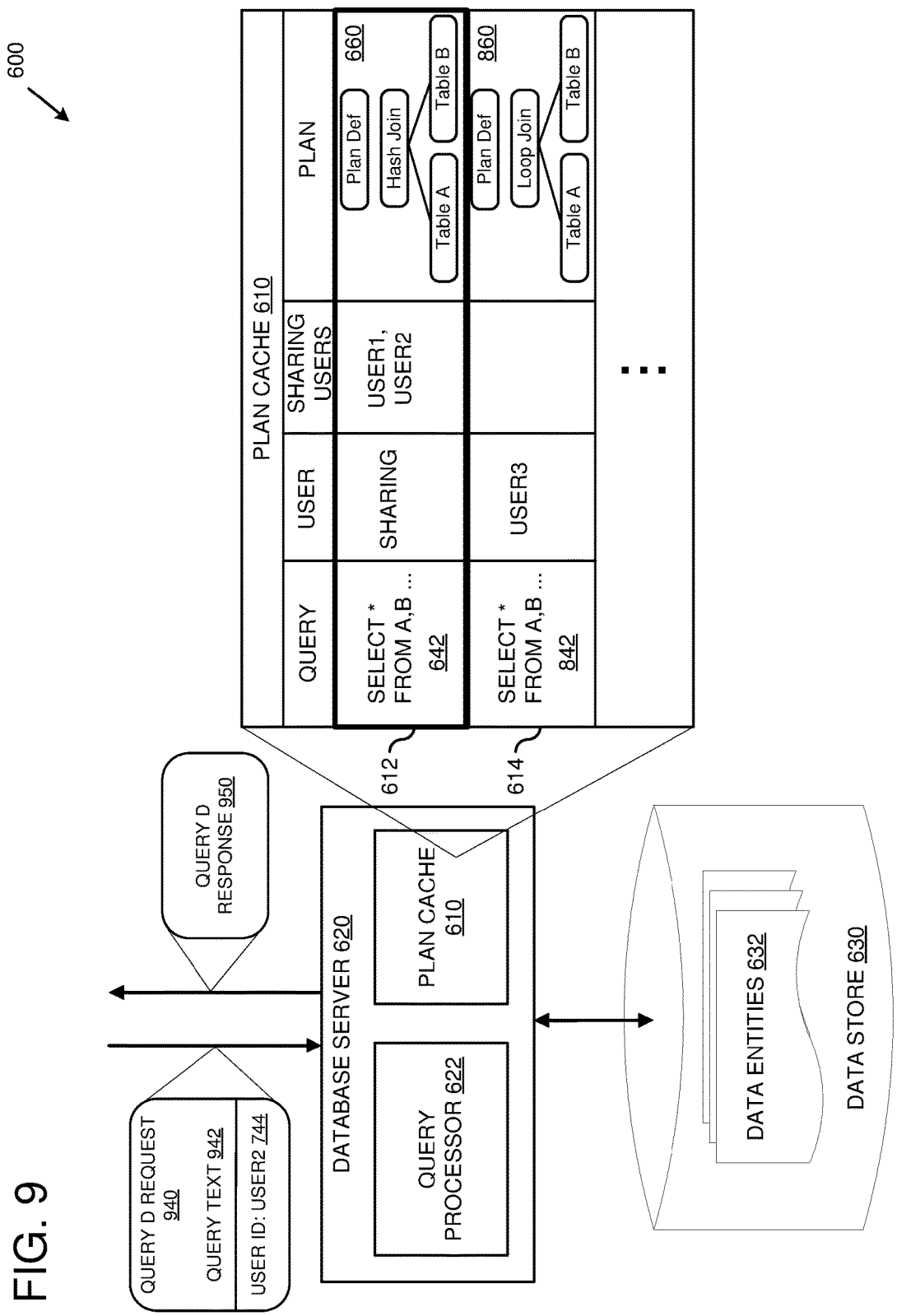

FIG. 9 is a system diagram depicting the example system 600 in another example scenario wherein the database server 620 receives a fourth database query request 940. The database query request 940 comprises query text 942 and the database user identifier 744 for the second database user. The query processor 622 searches the shared execution plan cache 610 for a compiled execution plan that is associated with the query text 942 and that is associated with the sharing user identifier. In the example scenario depicted in FIG. 9, the query processor 622 matches the query text 942 to the query text 642 in the cache record 612, and determines that the compiled execution plan 660 is associated with the query text 942 and the sharing user identifier. The query processor 622 searches the sharing users list associated with the cache record 612 and locates the database user identifier 744 in the list. The query processor 622 then retrieves the compiled execution plan 660 from the shared execution plan cache 610 and executes the compiled execution plan 660 to perform the requested database query using one or more of the data entities 632. The query processor 622 then generates a query response 950 and transmits the query response 950 to the requester that transmitted the query request 940.

Figure 10:
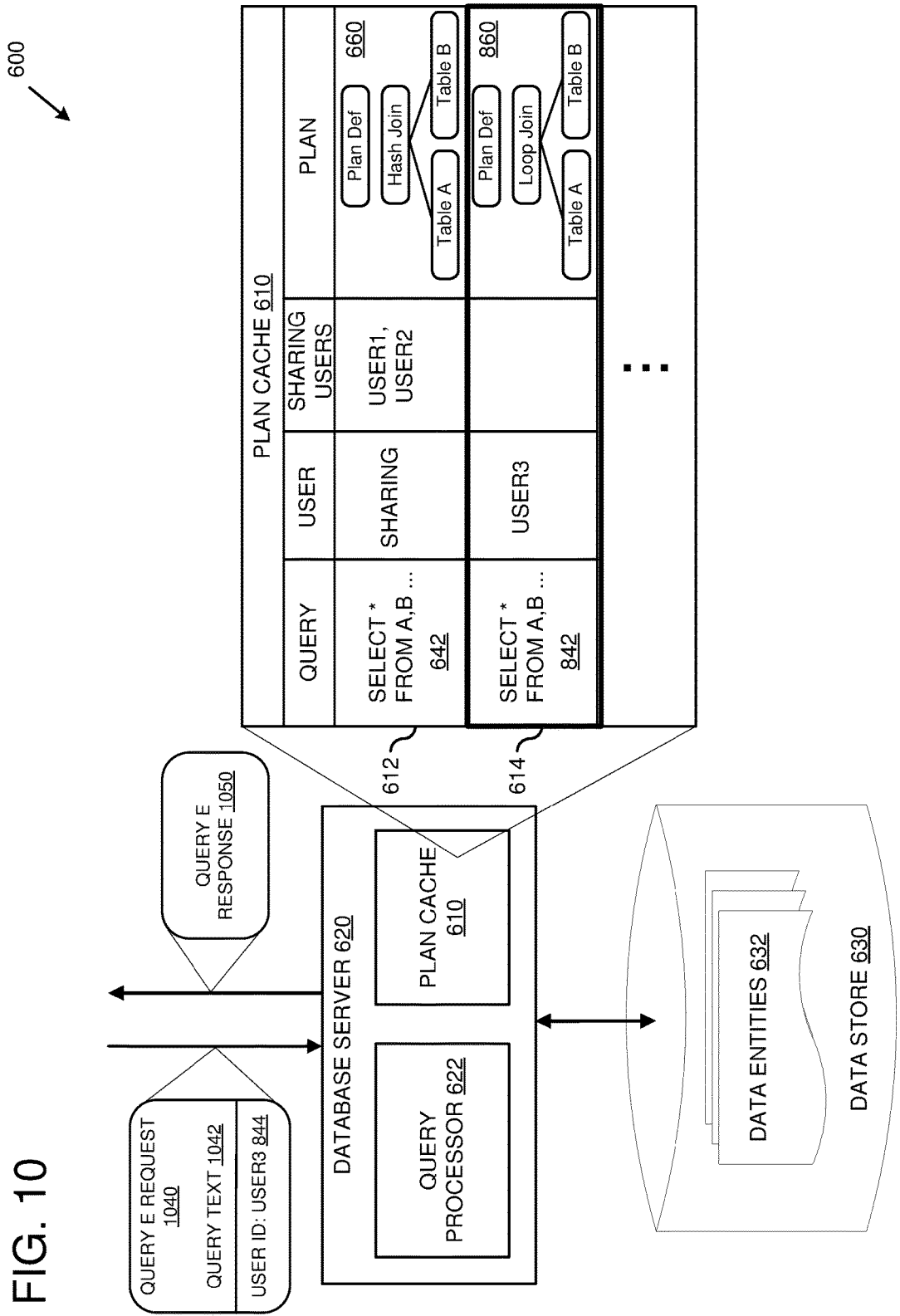

FIG. 10 is a system diagram depicting the example system 600 in another example scenario wherein the database server 620 receives a fifth database query request 1040. The database query request 1040 comprises query text 1042 and the database user identifier 844 for the third database user. The query processor 622 searches the shared execution plan cache 610 for a compiled execution plan that is associated with the query text 1042 and that is associated with the sharing user identifier. In the example scenario depicted in FIG. 10, the query processor 622 matches the query text 1042 to the query text 642 in the cache record 612, and determines that the compiled execution plan 660 is associated with the query text 1042 and the sharing user identifier. The query processor 622 searches the sharing users list associated with the cache record 612 and determines that the database user identifier 844 is not included in the list.

The query processor 622 then searches the shared execution plan cache 610 for a compiled execution plan that is associated with the query text 1040 and that is associated with the database user identifier 844. In the example scenario depicted in FIG. 10, the query processor 622 matches the query text 1042 to the query text 842 in the cache record 614, and determines that the compiled execution plan 860 is associated with the query text 1042 and the database user identifier 844. The query processor 622 then retrieves the compiled execution plan 860 from the shared execution plan cache 610 and uses the compiled execution plan 860 to perform the requested database query using one or more of the data entities 632. The query processor 622 then generates a query response 1050 and transmits the query response 1050 to the requester that transmitted the query request 1040.

EXAMPLE 7

Example Computing Systems

Figure 11:
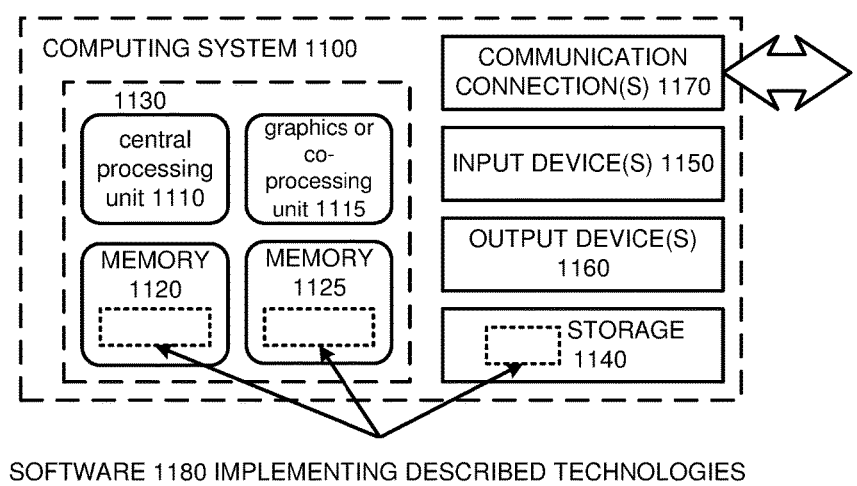
FIG. 11 is a block diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, solid state drives, etc.), or some combination of the two, accessible by the processing unit(s). The memory 1120, 1125 can store software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, solid state drives, CD-ROMs, DVDs, or any other medium which can be used to store information in a non-transitory way and which can be accessed within the computing system 1100. The storage 1140 can store instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 8

Example Cloud Computing Environment

Figure 12:
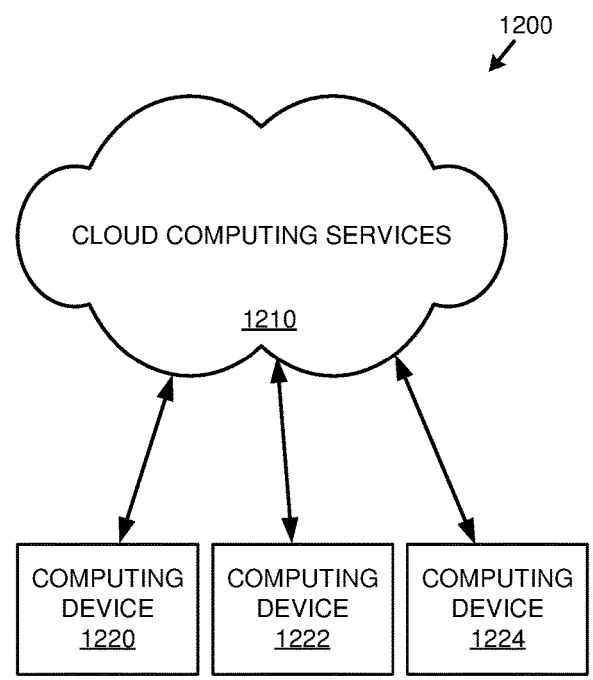
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

EXAMPLE 9

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A computer-implemented method for processing a database query using a multi-user execution plan cache, the method comprising:
   receiving a query request comprising a database query and a database user identifier;
   identifying a compiled execution plan associated with the database query in the multi-user execution plan cache;
   determining that the compiled execution plan is associated with a sharing user identifier, which indicates that the compiled execution plan is shared by multiple database users;
   determining that the database user identifier is associated with one of the multiple database users sharing the compiled execution plan; and
   using the compiled execution plan to execute the database query against the database.

2. The method of claim 1, further comprising determining that the compiled execution plan is valid, wherein the determining comprises:
    identifying a data entity in the database that is targeted by the database query;
    comparing a version number of the data entity in the database to a version number of the data entity associated with the compiled execution plan; and
    determining that the version numbers match and that the compiled execution plan is valid.

3. The method of claim 2, wherein the identifying the data entity and the version number of the data entity associated with the compiled execution plan comprises analyzing a metadata file associated with the compiled execution plan that comprises one or more data entity identifiers and one or more data entity version numbers for one or more data entities targeted by the compiled execution plan.

4. The method of claim 1, further comprising:
    compiling the compiled execution plan, wherein the compiled execution plan is compiled using a second database query received as part of a second query request associated with an identifier for a second database user;
    determining that the compiled execution plan is shareable;
    storing the compiled execution plan in the multi-user execution plan cache in association with the sharing user identifier; and
    storing the identifier for the second database user in association with the compiled execution plan in the multi-user execution plan cache, wherein the association between the identifier for the second database user and the compiled execution plan indicates that the second database user is one of the multiple users sharing the compiled execution plan.

5. The method of claim 4, wherein the determining that the compiled execution plan is shareable comprises determining that execution of the compiled execution plan for the second database user requires access to a data entity in the database to which access is restricted.

6. The method of claim 4, wherein the determining that the compiled execution plan is shareable comprises determining that execution of the compiled execution plan for the second database user requires a compile-time determination of a user-specific operation.

7. The method of claim 1, further comprising:
    receiving a second database query request comprising a second database query and an identifier of a second database user;
    searching the multi-user execution plan cache for a compiled execution plan associated with the second database query;
    identifying the compiled execution plan associated with the database query in the multi-user execution plan cache;
    determining that the compiled execution plan is associated with the sharing user identifier;
    determining that the second database user identifier is not associated with one of the multiple users sharing the compiled execution plan; and
    compiling an execution plan using the second database query.

8. The method of claim 7, further comprising:
    determining that the compiled execution plan compiled using the second database query is not shareable; and
    storing the compiled execution plan in the multi-user execution plan cache in association with the second database user identifier.

9. The method of claim 1, wherein the identifying the compiled execution plan in the multi-user execution plan cache comprises:
    searching the multi-user execution plan cache for a compiled execution plan for the database query that is associated with the sharing user identifier.

10. The method of claim 1, wherein the database user identifier comprises an identifier for a database connection with which the database user is associated.

11. A system for processing a database query using a shared execution plan cache, the system comprising a database server, wherein the database server comprises:
    a shared execution plan cache comprising a pre-compiled execution plan associated with multiple database users; and
    a query processor configured to:
        receive a query request comprising a database query and a database user identifier;
        use the database query to retrieve the pre-compiled execution plan from the shared execution plan cache;
        determine that the pre-compiled execution plan is associated with a sharing user identifier;
        determine whether the database user identifier is associated with the sharing user identifier for the pre-compiled execution plan;
        use the pre-compiled execution plan to execute the database query if the database user identifier is associated with the sharing user identifier; and
        otherwise compile an execution plan using the database query and use the compiled execution plan to execute the database query.

12. The system of claim 11, wherein the query processor is further configured to:
    compare the compiled execution plan to the pre-compiled execution plan;
    determine that the compiled execution plan and the pre-compiled execution plan are equivalent; and
    associate the database user identifier with the sharing user identifier for the pre-compiled execution plan in the shared execution plan cache.

13. The system of claim 11, wherein the query processor is further configured to:
    compare the compiled execution plan to the pre-compiled execution plan;
    determine that the compiled execution plan and the pre-compiled execution plan are not equivalent; and
    store the compiled execution plan in the shared execution plan cache in association with the database user identifier.

14. The system of claim 11, wherein the query processor is further configured to:
    receive a second query request comprising the database query and a second database user identifier;
    use the database query to search for the pre-compiled execution plan for the database query in the shared execution plan cache;
    determine that the pre-compiled execution plan is not valid for a database user associated with the second database user;
    compile a second execution plan using the database query; and
    use the second compiled execution plan to execute the database query for the database user associated with the second user identifier.

15. The system of claim 14, wherein the query processor is further configured to:

determine whether the second compiled execution plan is shareable;

if the second compiled execution plan is shareable, storing the second compiled execution plan in the shared execution plan cache in association with the sharing user identifier and associating the second user identifier with the sharing user identifier; and otherwise, storing the second compiled execution plan in the shared execution plan cache in association with the second user identifier.

16. The system of claim 15, wherein determining whether the second compiled execution plan is shareable comprises determining whether execution of the second compiled execution plan requires access to a data entity to which access is restricted to the database user associated with the second user identifier.

17. The system of claim 11, wherein the query processor is further configured to:

determine whether the pre-compiled execution plan is valid;

use the pre-compiled execution plan to execute the database query if the pre-compiled execution plan is valid; and otherwise, compile an execution plan using the database query and use the compiled execution plan to execute the database query.

18. The system of claim 17, wherein determining whether the pre-compiled execution plan is valid comprises determining whether a version number of a data entity that is referenced by the database query is equal to a version number of the data entity that is referenced in the pre-compiled execution plan.

19. The system of claim 17, wherein the query processor is further configured to:

replace the invalid pre-compiled execution plan in the shared execution plan cache with the execution plan compiled using the database query.

20. One or more computer-readable media storing instructions that, when executed by one or more processors, cause the one or more processors to perform operations, the operations comprising:

receiving a first request comprising a database query, wherein the first request is associated with a first database user;

determining that a compiled execution plan for the database query does not exist in an execution plan cache in association with a sharing user identifier;

determining that a compiled execution plan for the database query does not exist in the execution plan cache in association with the first database user;

generating a compiled execution plan using the databases query;

determining that the compiled execution plan is shareable;

storing the compiled execution plan in the query plan cache in association with the sharing user identifier;

using the compiled execution plan to execute the database query against a database;

receiving a second request comprising the database query, wherein the second request is associated with a second database user;

determining that the compiled execution plan for the database query exists in the query plan cache in association with the sharing user identifier;

determining that the compiled execution plan is valid for the second database user; and using the compiled execution plan to execute the database query against the database.

* * * * *